Feb. 6, 1934.    L. L. STEELE    1,946,005
COATED MOTION PICTURE FILM
Filed Feb. 28, 1929
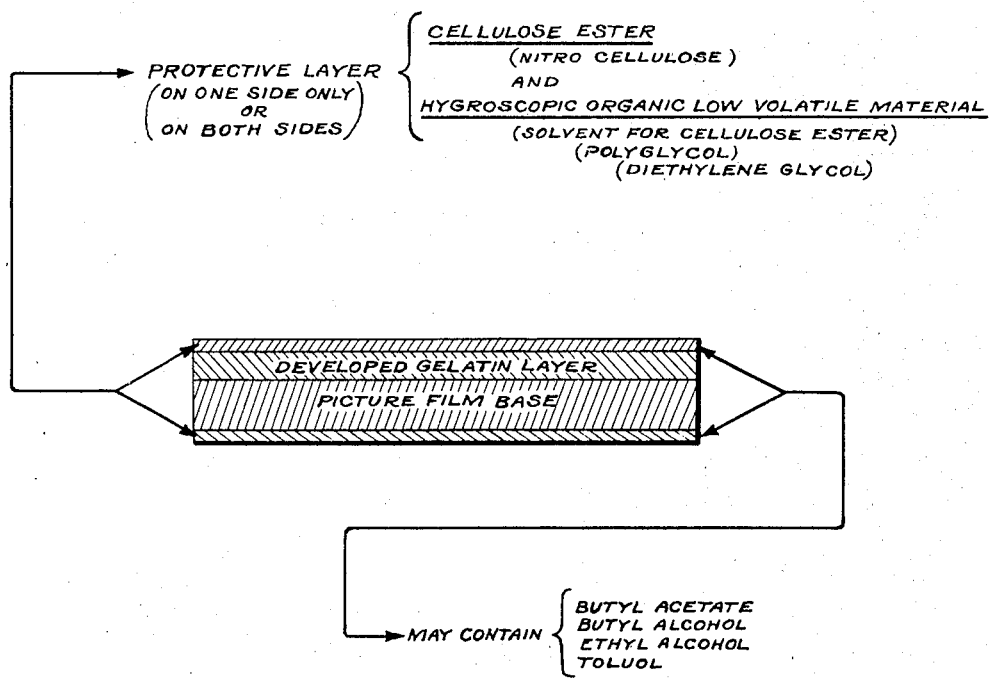
Inventor
Lawrence L. Steele,
By
Attorneys Patented Feb. 6, 1934

1,946,005

UNITED STATES PATENT OFFICE 1,946,005

COATED MOTION PICTURE FILM

Lawrence L. Steele, Washington, D. C., assignor to The Essem Laboratories, Incorporated, Washington, D. C., a corporation of Maryland Application February 28, 1929. Serial No. 343,563

10 Claims. (Cl. 88—19.5)

This invention relates to motion picture films and an object thereof is to provide such a film which is quite flexible and will maintain its flexibility over extended periods of time during storage, particularly in a dry atmosphere, and also will maintain its flexibility when subjected to relatively high temperature in passing through the usual projection machine.

It is also an object of the invention to provide a motion picture film having a surface which shall be extremely highly resistant to marring or scratching incident to handling and particularly by the wear and tear on the film incident to its passage through the projection machine.

It has heretofore been found that the usual motion picture film comprising a pyroxylin or other cellulose derivative base and a gelatine layer will not maintain its flexibility but on the contrary will become brittle when stored over extended periods in a relative dry atmosphere and particularly when subjected to the temperatures evolved in the projection machine. The generally accepted reason for this loss of flexibility of the film as a whole is based on the deterioration of the pyroxylin material of which the foundation or backing layer is composed. However, I have found that this loss of flexibility is due mainly to the loss of moisture content of the gelatin layer. The present invention proposes to coat the usual motion picture film on the gelatin side only or upon both sides with a cellulose ester material including in its composition an ingredient of a hygroscopic nature which will take up moisture from the atmosphere and transfer it to the gelatin layer and thereby at all times maintain a sufficient moisture content in the gelatin layer to thereby preserve a high degree of flexibility of the motion picture film. Preferably the hygroscopic ingredient employed is an organic material of low volatility and the best results are obtained by the use of a coating wherein the hygroscopic material is also a solvent for cellulose esters. The use of such a material promotes a greatly improved bond between the gelatin layer and the coating.

In the accompany drawing I have, without restricting my invention thereto, shown a film embodying my invention, the view being a conventional cross sectional showing on an enlarged scale.

In practicing the invention the motion picture film is provided upon the gelatin side only or upon both sides with a coating comprising as its principal ingredients a cellulose ester such as nitro cellulose and a polyglycol preferably diethylene glycol. If desired, suitable proportions of the usual diluents may be employed as well as suitable proportions of other solvents of cellulose ester material. A coating having its ingredients in the following proportions by weight has been found to be highly satisfactory, nitro cellulose 100 parts, diethylene glycol 40 parts, butyl acetate 200 parts, butyl alcohol 150 parts, ethyl alcohol (denatured) 1250 parts, and toluol 1250 parts.

Diethylene glycol is a solvent for cellulose ester material and also has marked hydroscopic characteristics. It also acts as a plasticizer for the cellulose ester coating material.

When the coated film is subjected to the drying action of the atmosphere or to the heat of the projection machine, sufficient moisture is taken from the atmosphere by the hygroscopic action of the polyglycol, and transferred to the gelatin to thereby maintain the necessary moisture therein and thereby prevent the film from becoming brittle. By reason of thus maintaining the desired moisture content of the gelatin layer it will be found that the flexibility of the film is preserved and buckling and shrinking thereof is prevented. The coating of the invention is also characterized by the quality of resistance to scratching by virtue of its hardness, comprising for the most part in the preferred form nitro cellulose and diethylene glycol.

What I claim is:

1. A developed motion picture film having a protective coating comprising a cellulose ester and a hygroscopic organic material of low volatility.

2. A developed motion picture film having a protective coating on the gelatin side only comprising a cellulose ester and a hygroscopic organic material of low volatility.

3. A developed motion picture film having a protective coating comprising nitro cellulose and a hydroscopic organic material of low volatility.

4. A developed motion picture film having a protective coating on the gelatin side only comprising nitro cellulose and a hygroscopic organic material of low volatility.

5. A developed motion picture film having a protective coating comprising a cellulose ester and a hygroscopic solvent therefor of low volatility.

6. A motion picture film having a coating comprising a cellulose ester and a polyglycol.

7. A motion picture film having a coating comprising a cellulose ester and diethylene glycol.

8. A developed motion picture film having a protective coating comprising nitro cellulose and a hygroscopic solvent therefor of low volatility.

9. A motion picture film having a coating comprising nitro cellulose and a polyglycol.

10. A motion picture film having a coating comprising nitro cellulose and diethylene glycol.

LAWRENCE L. STEELE.